(12) United States Patent
Willis

(10) Patent No.: US 8,445,631 B2
(45) Date of Patent: May 21, 2013

(54) METAL-NEUTRALIZED SULFONATED BLOCK COPOLYMERS, PROCESS FOR MAKING THEM AND THEIR USE

(75) Inventor: Carl Lesley Willis, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 245 days.

(21) Appl. No.: 12/578,210

(22) Filed: Oct. 13, 2009

(65) Prior Publication Data

US 2011/0086977 A1   Apr. 14, 2011

(51) Int. Cl.
*C08F 6/14* (2006.01)
*C08F 8/36* (2006.01)

(52) U.S. Cl.
USPC .......... 528/489; 528/482; 528/488; 528/490; 525/333.5; 525/357

(58) Field of Classification Search
USPC ............... 528/482, 488, 489, 490; 525/333.5, 525/357
See application file for complete search history.

(56) References Cited

U.S. PATENT DOCUMENTS

| | | | |
|---|---|---|---|
| 2,854,425 A | 9/1958 | Bogel et al. | |
| 3,149,182 A | 9/1964 | Porter | |
| 3,281,257 A | 10/1966 | Shy | |
| 3,450,795 A | 6/1969 | Langer | |
| 3,494,942 A | 2/1970 | Miki et al. | |
| 3,577,357 A | 5/1971 | Winkler | |
| RE27,145 E | 6/1971 | Jones | |
| 3,595,942 A | 7/1971 | Wald et al. | |
| 3,634,594 A | 1/1972 | Hiyama | |
| 3,670,054 A | 6/1972 | De La Mare et al. | |
| 3,682,768 A | 8/1972 | Adams et al. | |
| 3,700,633 A | 10/1972 | Wald et al. | |
| 3,735,559 A | 5/1973 | Salemme | |
| 3,783,072 A | 1/1974 | Korpman | |
| 3,985,830 A | 10/1976 | Fetters et al. | |
| 4,039,593 A | 8/1977 | Kamienski et al. | |
| 4,107,236 A | 8/1978 | Nayla et al. | |
| 4,313,867 A | 2/1982 | Duvdenvani | |
| 4,365,023 A | 12/1982 | Fujimoto | |
| 4,391,949 A | 7/1983 | St. Clair | |
| 4,444,953 A | 4/1984 | St. Clair | |
| 4,678,025 A | 7/1987 | Oberlander et al. | |
| 4,728,429 A | 3/1988 | Cabasso et al. | |
| 4,766,161 A | 8/1988 | Chlanda et al. | |
| 4,797,318 A | 1/1989 | Brooker et al. | |
| 4,931,070 A | 6/1990 | Prasad | |
| 4,934,148 A | 6/1990 | Prasad et al. | |
| 4,944,776 A | 7/1990 | Keyser et al. | |
| 4,946,899 A | 8/1990 | Kennedy et al. | |
| 5,095,054 A | 3/1992 | Lay et al. | |
| 5,145,748 A | 9/1992 | Gaidis et al. | |
| 5,239,010 A * | 8/1993 | Balas et al. ................... | 525/314 |
| 5,288,773 A | 2/1994 | Gorbaty et al. | |
| 5,340,387 A | 8/1994 | Smith | |
| 5,348,691 A | 9/1994 | McElroy et al. | |
| 5,389,711 A | 2/1995 | Westbrook et al. | |
| 5,468,574 A | 11/1995 | Ehrenberg et al. | |
| 5,516,831 A * | 5/1996 | Pottick et al. ................. | 524/474 |
| 5,620,500 A | 4/1997 | Fukui et al. | |
| 5,677,074 A | 10/1997 | Serpico et al. | |
| 5,679,482 A | 10/1997 | Ehrenberg et al. | |
| 5,679,745 A | 10/1997 | Hamada et al. | |
| 5,709,921 A | 1/1998 | Shawer | |
| 5,785,117 A | 7/1998 | Grinbergs | |
| 5,827,602 A | 10/1998 | Koch et al. | |
| 5,840,387 A | 11/1998 | Berlowitz-Tarrant et al. | |
| 5,925,621 A | 7/1999 | Zaneveld et al. | |
| 6,028,115 A | 2/2000 | Zaneveld et al. | |
| 6,033,804 A | 3/2000 | Doyle et al. | |
| 6,145,588 A | 11/2000 | Martin et al. | |
| 6,239,182 B1 | 5/2001 | Zaneveld et al. | |
| 6,306,419 B1 | 10/2001 | Vachon et al. | |
| 6,391,981 B1 | 5/2002 | Willis et al. | |
| 6,413,298 B1 | 7/2002 | Wnek et al. | |
| 6,444,767 B1 | 9/2002 | Schade et al. | |
| 6,455,651 B1 | 9/2002 | Willis et al. | |
| 6,492,469 B2 | 12/2002 | Willis et al. | |
| 6,515,083 B2 | 2/2003 | Ozawa et al. | |
| 6,531,241 B1 | 3/2003 | McEwen | |
| 6,536,514 B1 | 3/2003 | Sugiyama et al. | |
| 6,537,538 B2 | 3/2003 | Zaneveld et al. | |
| 6,579,948 B1 | 6/2003 | Tan et al. | |
| 6,664,309 B2 | 12/2003 | Svenningsen et al. | |
| 6,664,340 B1 | 12/2003 | Kaerki et al. | |
| 6,686,423 B1 | 2/2004 | Desbois et al. | |
| 6,699,941 B1 | 3/2004 | Handlin et al. | |
| 6,703,446 B2 | 3/2004 | Schwindeman et al. | |
| 6,716,777 B2 | 4/2004 | Lin | |
| 6,767,976 B2 | 7/2004 | Hamada et al. | |

(Continued)

FOREIGN PATENT DOCUMENTS

| CA | 716645 | 8/1965 |
|---|---|---|
| CA | 2377553 A1 | 2/2001 |

(Continued)

OTHER PUBLICATIONS

Coates, Geoffrey W.; Hustad, Phillip D. and Reinartz, Stefan, Catalysts for the Living Insertion Polymerization of Alkenes: Access to New Polyolefin Architectures Using Ziegler-Natta Chemistry, Agnew Chem. Int. Ed., 2002, 41, 2236-2257, Wiley-VCH, Verlag GmbH, 69451 Weinheim, Germany.

(Continued)

*Primary Examiner* — Tae H Yoon
(74) *Attorney, Agent, or Firm* — Novak Druce + Quigg, LLP; Michael A. Masse

(57) ABSTRACT

The present disclosure relates to a process for neutralizing a sulfonated block copolymer with a metal compound, to metal-neutralized block copolymers, and to various articles comprising the metal-neutralized block copolymers, e.g., in form of a water vapor permeable membrane which comprises the metal-neutralized block copolymers. The present disclosure further relates to a means and a method for storing and stabilizing a polar component such as a metal compound in a non-polar liquid phase by immuring the polar component in micelles of the sulfonated block copolymer in the non-polar liquid phase.

12 Claims, No Drawings

U.S. PATENT DOCUMENTS

| | | |
|---|---|---|
| 6,777,082 B2 | 8/2004 | Patel et al. |
| 6,838,391 B2 | 1/2005 | Harle |
| 6,841,601 B2 | 1/2005 | Serpico et al. |
| 6,932,619 B2 | 8/2005 | Chen |
| 7,029,559 B2 | 4/2006 | Won et al. |
| 7,060,788 B2 | 6/2006 | Hucks et al. |
| 7,152,670 B2 | 12/2006 | Dobbs et al. |
| 7,160,551 B2 | 1/2007 | McHugh et al. |
| 7,188,666 B2 | 3/2007 | Lee et al. |
| 7,228,891 B2 | 6/2007 | Shin et al. |
| 7,231,967 B2 | 6/2007 | Haglid |
| 7,307,127 B1 | 12/2007 | Napadensky et al. |
| 7,309,522 B2 | 12/2007 | Webb et al. |
| 7,312,292 B2 | 12/2007 | Ravikiran |
| 7,320,361 B2 | 1/2008 | Arai et al. |
| 7,323,265 B2 | 1/2008 | Fan et al. |
| 7,598,337 B2 | 10/2009 | Hung et al. |
| 7,601,785 B2 | 10/2009 | Chang et al. |
| 7,754,844 B2 | 7/2010 | Sakaguchi et al. |
| 7,807,759 B2 | 10/2010 | Shin et al. |
| 7,851,575 B2 | 12/2010 | Ravikiran et al. |
| 7,977,713 B2 | 7/2011 | Sankin et al. |
| 8,012,539 B2 | 9/2011 | Handlin et al. |
| 8,058,353 B2 * | 11/2011 | Willis et al. ............... 525/333.5 |
| 2001/0053475 A1 | 12/2001 | Ying et al. |
| 2003/0049511 A1 | 3/2003 | Ritts et al. |
| 2003/0106680 A1 | 6/2003 | Serpico et al. |
| 2003/0129469 A1 | 7/2003 | Sun et al. |
| 2003/0176582 A1 | 9/2003 | Bening et al. |
| 2003/0198858 A1 | 10/2003 | Sun et al. |
| 2003/0228681 A1 | 12/2003 | Serpico et al. |
| 2004/0005490 A1 | 1/2004 | Fan et al. |
| 2004/0029014 A1 | 2/2004 | Hwang et al. |
| 2004/0101753 A1 | 5/2004 | Hwang |
| 2004/0137813 A1 | 7/2004 | Faucher |
| 2004/0142910 A1 | 7/2004 | Vachon et al. |
| 2004/0234851 A1 | 11/2004 | Kim et al. |
| 2005/0061381 A1 | 3/2005 | Hosoi |
| 2005/0133204 A1 | 6/2005 | Gates et al. |
| 2005/0266290 A1 | 12/2005 | Sun et al. |
| 2006/0154126 A1 | 7/2006 | Ritts et al. |
| 2007/0021569 A1 | 1/2007 | Willis et al. |
| 2008/0085437 A1 | 4/2008 | Dean et al. |
| 2008/0124563 A1 | 5/2008 | Shima |
| 2008/0305251 A1 | 12/2008 | Fukuta et al. |
| 2009/0123804 A1 | 5/2009 | Yamashita et al. |
| 2009/0126370 A1 | 5/2009 | Tsai |
| 2009/0246593 A1 | 10/2009 | Nowatari et al. |
| 2009/0263699 A1 | 10/2009 | Sadasue et al. |
| 2009/0280255 A1 * | 11/2009 | Handlin et al. ............... 427/358 |
| 2009/0314480 A1 | 12/2009 | Grinbergs et al. |
| 2010/0031817 A1 | 2/2010 | Ehrenberg et al. |
| 2010/0048817 A1 * | 2/2010 | Dado et al. ............... 525/98 |
| 2010/0087783 A1 | 4/2010 | Weber et al. |
| 2010/0159353 A1 | 6/2010 | Ohgi et al. |
| 2010/0167100 A1 | 7/2010 | Moore et al. |
| 2010/0167159 A1 | 7/2010 | Ono et al. |
| 2010/0170776 A1 | 7/2010 | Ehrenberg et al. |
| 2010/0204403 A1 | 8/2010 | Willis et al. |
| 2010/0233569 A1 | 9/2010 | Ono et al. |
| 2010/0261799 A1 | 10/2010 | Vachon et al. |
| 2010/0264369 A1 | 10/2010 | Zhang |
| 2010/0273901 A1 | 10/2010 | Ehrenberg et al. |
| 2011/0230614 A1 | 9/2011 | Handlin et al. |
| 2011/0268901 A1 | 11/2011 | Handlin et al. |

FOREIGN PATENT DOCUMENTS

| | | |
|---|---|---|
| CA | 2616250 A1 | 1/2007 |
| DE | 3930217 A1 | 3/1991 |
| DE | 19728686 C1 | 4/1999 |
| FR | 2662604 A2 | 12/1991 |
| GB | 419604 A | 11/1934 |
| GB | 949126 A | 2/1956 |
| GB | 1019847 A | 10/1963 |
| GB | 1144167 A | 3/1969 |
| GB | 1336764 A | 11/1973 |
| GB | 1380411 A | 1/1975 |
| GB | 2066267 A | 7/1981 |
| GB | 2107325 A | 4/1983 |
| GB | 2168648 A | 6/1986 |
| GB | 2272220 A | 5/1994 |
| GB | 2399787 A | 9/2004 |
| GB | 2434762 A | 8/2007 |
| GB | 2444242 A | 6/2008 |
| JP | 53136082 A | 11/1978 |
| JP | 1256583 A | 10/1989 |
| JP | 1559652 C | 5/1990 |
| JP | 4053885 A | 2/1992 |
| JP | 5303918 A | 11/1993 |
| JP | 6000923 A | 1/1994 |
| JP | 7018237 A | 1/1995 |
| JP | 1910228 C | 3/1995 |
| JP | 1914163 C | 3/1995 |
| JP | 7060907 A | 3/1995 |
| JP | 7082428 A | 3/1995 |
| JP | 1926012 C | 4/1995 |
| JP | 2549576 B2 | 10/1996 |
| JP | 9074273 A | 3/1997 |
| JP | 9078431 A | 3/1997 |
| JP | 9094925 A | 4/1997 |
| JP | 9156009 A | 6/1997 |
| JP | 9217046 A | 8/1997 |
| JP | 9235524 A | 9/1997 |
| JP | 9277478 A | 10/1997 |
| JP | 10061057 A | 3/1998 |
| JP | 10110150 A | 4/1998 |
| JP | 10158454 A | 6/1998 |
| JP | 10298514 A | 11/1998 |
| JP | 2837435 B2 | 12/1998 |
| JP | 2843947 B2 | 1/1999 |
| JP | 2868391 B2 | 3/1999 |
| JP | 3704906 B2 | 3/1999 |
| JP | 11080681 A | 3/1999 |
| JP | 11158299 A | 6/1999 |
| JP | 11199839 A | 7/1999 |
| JP | 2000033671 A | 2/2000 |
| JP | 2000038550 A | 2/2000 |
| JP | 2000136367 A | 5/2000 |
| JP | 2000318102 A | 11/2000 |
| JP | 2000345120 A | 12/2000 |
| JP | 2001020169 A | 1/2001 |
| JP | 2001062968 A | 3/2001 |
| JP | 3164554 B2 | 5/2001 |
| JP | 3249005 B2 | 1/2002 |
| JP | 2002338918 A | 1/2002 |
| JP | 2004050612 A | 2/2002 |
| JP | 2002105424 A | 4/2002 |
| JP | 3326195 B2 | 9/2002 |
| JP | 3338179 B2 | 10/2002 |
| JP | 3358391 B2 | 12/2002 |
| JP | 3370198 B2 | 1/2003 |
| JP | 3411068 B2 | 5/2003 |
| JP | 3484840 B2 | 1/2004 |
| JP | 3515740 B2 | 4/2004 |
| JP | 2004121828 A | 4/2004 |
| JP | 2004136480 A | 5/2004 |
| JP | 3660771 B2 | 6/2005 |
| JP | 2006021959 A | 1/2006 |
| JP | 3787935 B2 | 6/2006 |
| JP | 2007001086 A | 1/2007 |
| JP | 3887341 B2 | 2/2007 |
| JP | 2007105134 A | 4/2007 |
| JP | 2007126512 A | 5/2007 |
| JP | 3940952 B2 | 7/2007 |
| JP | 3967842 B2 | 8/2007 |
| JP | 2007238746 A | 9/2007 |
| JP | 2008073888 B2 | 4/2008 |
| JP | 2008127447 A | 6/2008 |
| JP | 2009143998 A | 7/2009 |
| JP | 4327040 B2 | 9/2009 |
| JP | 4414016 B2 | 2/2010 |
| JP | 2010085585 A | 4/2010 |
| JP | 2010106090 A | 5/2010 |
| JP | 4544563 B2 | 9/2010 |
| KR | 20020076825 A | 10/2002 |
| KR | 20040013555 A | 2/2004 |

| WO | 9821773 A1 | 5/1998 |
| WO | 0109239 A1 | 2/2001 |
| WO | 0272242 A1 | 1/2002 |
| WO | 03050896 A3 | 10/2002 |
| WO | 03050897 A3 | 10/2003 |
| WO | 2004004688 A1 | 1/2004 |
| WO | 2004032306 A3 | 7/2004 |
| WO | 2004070312 A1 | 8/2004 |
| WO | 2004051172 A1 | 3/2005 |
| WO | 2007010042 A1 | 1/2007 |
| WO | WO2008/089332 * | 7/2008 |

OTHER PUBLICATIONS

Zhang, Hao and Nomura, Kotohiro, Living Copolymerization of Ethylene with Styrene Catalyzed by (Cyclopentadienyl)(ketimide)titanium(IV) Complex-MAO Catalyst System, J. Am. Chem. Soc. 2005, 127, 9364-9365, Published on Web Jun. 10, 2005, JACS Communications.

A.S. Yeung and C.W. Frank, Polymer, 31, pp. 2089-2100, 2100-2111 (1990).

C.J. Hawker, A.W. Bosman and E. Harth, Chem. Rev., 101(12) 3661-3688 (2001).

U.S. Appl. No. 12/578,404, filed Oct. 13, 2009.

* cited by examiner

METAL-NEUTRALIZED SULFONATED BLOCK COPOLYMERS, PROCESS FOR MAKING THEM AND THEIR USE

FIELD OF THE INVENTION

The present disclosure relates to a process for neutralizing a sulfonated block copolymer with a metal compound, to metal-neutralized block copolymers, and to various articles comprising the metal-neutralized block copolymers, e.g., in form of a water vapor permeable membrane which comprises the metal-neutralized block copolymers. The present disclosure further relates to a means and a method for storing and stabilizing a polar component such as a metal compound in a non-polar liquid phase by immuring the polar component in micelles of the sulfonated block copolymer in the non-polar liquid phase.

BACKGROUND OF THE INVENTION

The preparation of styrenic block copolymers is well known in the art. Generally, styrenic block copolymers ("SBC") can comprise internal polymer blocks and terminal end polymer blocks comprising chemically different monomer types thereby providing particular desirable properties. As an example, in a more common form, SBC's may have internal blocks of conjugated diene and external blocks having aromatic alkenyl arenes. The interaction of the differing properties of the polymer blocks allow for different polymer characteristics to be obtained. For example, the elastomer properties of internal conjugated diene blocks along with the "harder" aromatic alkenyl arenes external blocks together form polymers which are useful for an enormous variety of applications. Such SBC's can be prepared through sequential polymerization and/or through coupling reactions.

It is known also that SBC's can be functionalized in order to further modify their characteristics. An example of this is the addition of sulfonic acid or sulfonate ester functional groups to the polymer backbone. One of the first such sulfonated block copolymers is disclosed, for example, in U.S. Pat. No. 3,577,357 to Winkler. The resulting block copolymer was characterized as having the general configuration A-B-(B-A)$_{1-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymers could be used as such, or could be used in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The sulfonated block copolymers were described as having water absorption characteristics that might be useful in water purification membranes and the like, but were later found not to be castable into films (U.S. Pat. No. 5,468,574).

More recently, US 2007/0021569 to Willis et al., disclosed the preparation of sulfonated polymer and inter alia illustrated a sulfonated block copolymer that is solid in water comprising at least two polymer end blocks and at least one saturated polymer interior block wherein each end block is a polymer block resistant to sulfonation and at least one interior block is a saturated polymer block susceptible to sulfonation, and wherein at least one interior blocks is sulfonated to the extent of 10 to 100 mol percent of the sulfonation susceptible monomer in the block. The sulfonated block copolymers are described as being able to transport high amounts of water vapor while at the same time having good dimensional stability and strength in the presence of water, and as being valuable materials for end use applications which call for a combination of good wet strength, good water and proton transport characteristics, good methanol resistance, easy film or membrane formation, barrier properties, control of flexibility and elasticity, adjustable hardness, and thermal/oxidative stability.

Additionally, WO 2008/089332 to Dado et al., discloses a process for preparing sulfonated block copolymers illustrating, e.g., the sulfonation of a precursor block polymer having at least one end block A and at least one interior block B wherein each A block is a polymer block resistant to sulfonation and each B block is a polymer block susceptible to sulfonation wherein said A and B blocks are substantially free of olefinic unsaturation. The precursor block polymer was reacted with an acyl sulfate in a reaction mixture further comprising at least one non-halogenated aliphatic solvent. According to Dado et al., the process results in a reaction product which comprised micelles of sulfonated polymer and/or other polymer aggregates of definable size and distribution.

It has also been reported that sulfonated polymers may be neutralized with a variety of compounds. U.S. Pat. No. 5,239,010 to Pottick et al., and U.S. Pat. No. 5,516,831 to Balas et al., for example, indicate that styrene blocks with sulfonic acid functional groups may be neutralized by reacting the sulfonated block copolymer with an ionizable metal compound to obtain a metal salt.

Additionally, US 2007/0021569 to Willis et al., indicated the at least partial neutralization of sulfonated block copolymers with a variety of base materials including, for example, ionizable metal compounds as well as various amines. It was further proposed that the sulfonated block copolymer may be modified by hydrogen bonding interaction with a base material which, while not sufficiently strong to neutralize the acid centers of the sulfonated block copolymer, is strong enough to achieve a significant attraction to the block copolymer via a hydrogen bonding interaction.

SUMMARY OF THE INVENTION

The present technology generally relates to a process for neutralizing a non-neutralized sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block. Generally, the process comprises providing a solution comprising the non-neutralized sulfonated block copolymer and an organic solvent, and adding at least one metal compound to the solution, wherein the metal has an atom number of at least 11.

In particular aspects, the process described herein meets one or more of the following conditions:

the solution comprises the dissolved, non-neutralized sulfonated block copolymer in micellar form, and/or from about 80% to about 100% of the sulfonic acid or sulfonate ester functional groups are neutralized, and/or the metal compound is added in an amount of from about 0.8 to about 10 metal equivalents per 1 equivalent of sulfonic acid or sulfonate ester functional group of the non-neutralized sulfonated block copolymer, and/or the organic solvent is a non-halogenated aliphatic solvent, and/or the organic solvent comprises at least a first and a second aliphatic solvent, and wherein the B block is substantially soluble in the first solvent and the A block is substantially soluble in the second solvent, and/or the metal compound is selected from the group of organo-metal compounds, metal hydrides, metal oxides, metal hydroxides, metal alkoxides, metal carbonates, metal hydrogencarbonates, and metal carboxylates, and/or the metal compound comprises sodium, potassium, cesium, magnesium, calcium, strontium, barium, aluminum, tin, lead, titanium, zirconium, vanadium, chromium, molybdenum, manganese, iron, cobalt, nickel, copper, silver, zinc, cadmium, or mercury, and/or the metal of the metal compound has an atom number of at least 12, and/or the metal compound comprises magnesium, calcium, aluminum, lead, titanium, copper, or zinc, and/or the metal is in an oxidation state of +2, +3 or +4.

The technology described herein further generally relates to a neutralized sulfonated block copolymer which is solid in water and which comprises at least two polymer end blocks A and at least one polymer interior block B, wherein a. each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block; and b. from 80% to 100% of the sulfonic acid or sulfonate ester functional groups of the sulfonated B blocks are neutralized with a metal compound, wherein the metal has an atom number of at least 11.

In particular aspects, the neutralized sulfonated block copolymer described herein meets one or more of the following conditions:

the metal compound comprises sodium, potassium, cesium, magnesium, calcium, strontium, barium, aluminum, tin, lead, titanium, zirconium, vanadium, chromium, molybdenum, manganese, iron, cobalt, nickel, copper, silver, zinc, cadmium, or mercury, and/or the metal compound comprises magnesium, calcium, aluminum, lead, titanium, copper, or zinc, and/or the metal is in an oxidation state of +2, +3 or +4, and/or the neutralized sulfonated block copolymer has a water uptake value which is equal to or less than the water uptake value of a corresponding, non-neutralized sulfonated block copolymer; and/or the neutralized sulfonated block copolymer has a wet tensile modulus which is equal to or greater than the wet tensile modulus of the corresponding, non-neutralized sulfonated block copolymer, and/or the neutralized sulfonated block copolymer has a water uptake value of less than 80% the water uptake value of the corresponding, non-neutralized sulfonated block copolymer, and/or the neutralized sulfonated block copolymer has a water uptake value of less than 50%-wt. of its dry weigh, and/or the neutralized sulfonated block copolymer has a water uptake value of at least 0.1%-wt. of its dry weight, and/or the neutralized sulfonated block copolymer is in hydrated form.

The technology described herein also generally relates to a hydrated, neutralized sulfonated block copolymer which comprises at least 0.1% by weight, based on the dry weight of the neutralized block copolymer, of water in incorporated form. In particular aspects, the hydrated, neutralized sulfonated block copolymer described herein, meets one or more of the following conditions:

the hydrated, neutralized sulfonated block copolymer has a water vapor transport rate of at least about 15,000 g/m$^2$/day/mil, and/or the hydrated, neutralized sulfonated block copolymer has a water transport rate of at least about 50% of the water transport rate of a hydrated form of a corresponding, non-neutralized sulfonated block copolymer, and/or the hydrated, neutralized sulfonated block copolymer has a wet tensile modulus which is equal to or greater than the wet tensile modulus of the hydrated form of the corresponding, non-neutralized sulfonated block copolymer, and/or the hydrated, neutralized sulfonated block copolymer has a water transport rate of at least about 75% of the water transport rate of a hydrated form of a corresponding non-neutralized sulfonated block copolymer.

The technology described herein further relates to an apparatus or device which comprises a membrane such as a device for controlling humidity, a device for forward electrodialysis, a device for reverse electrodialysis, a device for pressure retarded osmosis, a device for forward osmosis, a device for reverse osmosis, a device for selectively adding water, a device for selectively removing water, and a battery. The respective apparatus or device, in each case, includes a membrane which comprises the aforementioned neutralized sulfonated block copolymer.

Moreover, the technology described herein generally relates to a means for storing a polar component comprising a non-polar, liquid phase and a sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, in which the non-polar, liquid phase comprises the aforementioned sulfonated block copolymer in micellar form adapted to immure the polar component.

The technology described herein additionally generally relates to a process for stabilizing or storing a polar component in a non-polar liquid phase. Generally, the process comprises a. providing solution comprising a non-polar, liquid phase and a sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block wherein the solution comprises the sulfonated block copolymer in micellar form, and b. adding at least one polar component to the solution (a) whereby the polar component is immured in the micelles.

In particular aspects of the process the polar component is a metal compound.

DETAILED DESCRIPTION OF THE INVENTION

A detailed description of embodiments of the present invention is disclosed herein; however, it is to be understood that the disclosed embodiments are merely exemplary of the invention and that the invention may be embodied in various and alternative forms of the disclosed embodiments. Therefore, specific structural and functional details which are addressed in describing the embodiments herein are not to be interpreted as limiting, but merely as a basis for the claims and as a representative basis for teaching one skilled in the art to variously employ the present invention.

Unless specifically stated otherwise, all technical terms used herein have the meaning as commonly understood by those skilled in the art.

Moreover, unless specifically stated otherwise, the following expressions as used herein are understood to have the following meanings.

The expressions "non-neutralized sulfonated block copolymer" and "precursor sulfonated block copolymer" as used herein refer to a sulfonated block copolymer that essentially has not been neutralized by an amine, metal or other polar compound and contains sulfonic acid and/or sulfonate ester functionality.

The expression "neutralized block copolymer" as used herein refers to a sulfonated block copolymer which has been neutralized at least partially.

The expression "engineering thermoplastic resin" as used herein encompasses the various polymers such as for example thermoplastic polyester, thermoplastic polyurethane, poly (aryl ether) and poly(aryl sulfone), polycarbonate, acetal resin, polyamide, halogenated thermoplastic, nitrile barrier resin, poly(methyl methacrylate) and cyclic olefin copolymers, and further defined in U.S. Pat. No. 4,107,131, the disclosure of which is hereby incorporated by reference.

The expression "equilibrium" as used herein in the context of water absorption refers to the state in which the rate of water absorption by a block copolymer is in balance with the rate of water loss by the block copolymer. The state of equilibrium can generally be reached by immersing a sulfonated block copolymer or a neutralized block copolymer of the present invention in water for a 24 hour period (one day). The equilibrium state may be reached also in other wet environments, however the period of time to reach equilibrium may differ.

The expression "hydrated" block copolymer as used herein refers to a block copolymer which has absorbed a significant amount of water.

The expression "wet state" as used herein refers to the state at which a block copolymer has reached equilibrium or has been immersed in water for a period of 24 hours.

The expression "dry state" as used herein refers to the state of a block copolymer which has absorbed essentially no or only insignificant amounts of water. For example, a sulfonated or neutralized block copolymer which is merely in contact with the atmosphere will generally remain in the dry state.

The expression "water uptake value" as used herein refers to the weight of water which is absorbed by a block copolymer in equilibrium as compared to the original weight of the dry material, and is calculated as a percentage. A lower water uptake value indicates that less water has been absorbed and therefore corresponds to a better dimensional stability.

All publications, patent applications, and patents mentioned herein are incorporated by reference in their entirety. In the event of conflict, the present specification, including definitions, is intended to control.

Further, all ranges disclosed herein are intended to include any combination of the mentioned upper and lower limits even if the particular combination and range is not specifically listed.

According to several embodiments of the present disclosure, it has been surprisingly found that neutralized sulfonated polymers may be obtained by directly contacting a micellar solution of the sulfonated block copolymer with a metal compound. By this process, a broad variety of metal compounds may be employed for neutralizing the sulfonated block copolymer and the subsequent formation of membranes and articles from this neutralized block copolymer. Furthermore, the process according to several embodiments allows for an intimate contact of the metal compound and the sulfonated block copolymer, and yields neutralized block copolymers suited as membrane materials which exhibit an unexpectedly superior balance of properties when compared with the properties of the non-neutralized sulfonated block copolymers. The particular properties include, but are not limited to:

(1) An exceptionally high water vapor transport rate;
(2) Dimensional stability under wet conditions, as evidenced by low water uptake values and low swelling;
(3) An increased wet tensile modulus as compared to that of the corresponding non-neutralized sulfonated block copolymer.
(4) Consistent tensile strengths in both wet and dry states.

Accordingly, the metal neutralized sulfonated block copolymers presented herein are broadly suited for a wide variety of applications in praxis, and are especially useful for applications which involve water or which take place in wet environments.

In some embodiments, the precursor sulfonated block polymers which may be neutralized according to embodiments of the present disclosure include the non-neutralized sulfonated block copolymers as described in US 2007/021569 to Willis et al., the entire disclosure of which is incorporated herein by reference. The precursor sulfonated block polymers, including the non-neutralized sulfonated block copolymers as described in US 2007/021569, may be prepared according to the process of WO 2008/089332 to Dado et al., the entire disclosure of which is hereby incorporated by reference.

The block copolymers needed to prepare the sulfonated block copolymers of the present invention may be made by a number of different processes, including anionic polymerization, moderated anionic polymerization, cationic polymerization, Ziegler-Natta polymerization, and living chain or stable free radical polymerization. Anionic polymerization is described below in more detail, and in the referenced documents. Moderated anionic polymerization processes for making styrenic block copolymers are disclosed, for example, in U.S. Pat. No. 6,391,981, U.S. Pat. No. 6,455,651 and U.S. Pat. No. 6,492,469, each of which is incorporated herein by reference. Cationic polymerization processes for preparing block copolymers are disclosed, for example, in U.S. Pat. No. 6,515,083 and U.S. Pat. No. 4,946,899, each of which is incorporated herein by reference.

Living Ziegler-Natta polymerization processes that can be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc., Comm., 2005) describe living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers can be synthesized by living or stable free radical techniques. Nitroxide mediated polymerization methods are preferred living chain or stable free radical polymerization processes when preparing the precursor polymers.

1. Polymer Structure

One aspect of the invention disclosed herein relates to the polymer structure of the neutralized sulfonated block copolymers. In one embodiment, the neutralized block copolymers made by the present invention will have at least two polymer end or outer blocks A and at least one saturated polymer interior block B wherein each A block is a polymer block which is resistant to sulfonation and each B block is a polymer block which is susceptible to sulfonation.

Preferred block copolymer structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n$ $(A)$, $(A-B-D)_nX$, $(A-D-B)_nX$ or mixtures thereof, where n is an integer from 2 to about 30, X is coupling agent residue and A, B and D are as defined hereinafter.

Most preferred structures are linear structures such as A-B-A, $(A-B)_2X$, A-B-D-B-A, $(A-B-D)_2X$, A-D-B-D-A, and $(A-D-B)_2X$ and radial structures such as $(A-B)_nX$ and $(A-D-B)_nX$ where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture will include a certain amount of A-B diblock copolymer, in addition to any linear and/or radial polymers. The respective amounts have not been found to be detrimental to the practice of the invention.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymer segments of ethylene, it may be useful to polymerize ethylene via a Ziegler-Natta process, as taught in the references in the review article by G. W. Coates et al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks will typically be between about 1,000 and about 60,000.

When the A blocks are polymers of alpha olefins of 3 to 18 carbon atoms, such polymers are prepared by via a Ziegler-Natta process, as taught in the references in the above-cited review article by G. W. Coates et al. Preferably, the alpha-olefins are propylene, butylene, hexane or octane, with propylene being most preferred. The block molecular weight for each of such alpha-olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosures is herein incorporated by reference.

The A blocks may also be polymer segments of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester in the present invention. Examples of the anionic polymerizable monomer that can be optionally used include methacrylic or acrylic monomers such as trimethylsilyl methacrylate, N—,N-dimethylmethacrylamide, N,N-diisopropylmethacrylamide, N,N-diethylmethacrylamide, N,N-methylethylmethacrylamide, N,N-di-tert-butylmethacrylamide, trimethylsilyl acrylate, N,N-dimethylacrylamide, N,N-di-isopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers such as those present in the B blocks which are addressed in more detail in the following. In some embodiments, the A blocks may contain up to 10 mol percent, preferably they will contain only up to 5 mol percent, and particularly preferably only up to 2 mol percent of the vinyl aromatic monomers as mentioned for the B blocks. However, in the most preferred embodiments, the A blocks will contain no vinyl monomers as present in the B blocks. The sulfonation level in the A blocks may be from 0 up to 15 mol percent of the total monomers in the A block. It will be understood by those skilled in the art that suitable ranges include any combination of the specified mol percents even if the specific combination and range is not listed herewith.

The saturated B blocks, in each case, comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers mentioned above, the B blocks may also comprise a hydrogenated copolymer of such monomer(s) with a conjugated diene selected from 1,3-butadiene, isoprene and mixtures thereof, having a vinyl content of between 20 and 80 mol percent. These copolymers with hydrogenated dienes may be random copolymers, tapered copolymers, block copolymers or controlled distribution copolymers. In one preferred embodiment, the B blocks are hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in US 2003/0176582, which disclosure is herein incorporated by reference. US 2003/0176582 also discloses the preparation of sulfonated block copolymers, albeit not the block copolymer structures of the present invention. The B blocks comprising a styrene block are described herein. In a preferred embodiment, the B blocks are made up of unsubstituted styrene and will not require a separate hydrogenation step.

In another aspect of the present invention, the block copolymer includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof the butadiene portion of the polymer block having a vinyl content prior to hydrogenation of between 20 and 80 mol percent and the polymer block having a number average molecular weight of between 1,000 and 50,000. In another embodiment, the impact modifier block D comprises an acrylate or silicone polymer having a number average molecular weight of 1,000 to 50,000. In still another embodiment, the impact modifier block D block is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that suitable ranges include any combination of the specified mol percents even if the specific combination is not listed herewith.

In a preferred embodiment, the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are such that each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percents even if the specific combination and range is not listed herewith. The level of sulfonation is determined by titration of a dry polymer sample, which has been re-dissolved in tetrahydrofuran with a standardized solution of NaOH in a mixed alcohol and water solvent.

2. Overall Anionic Process to Prepare Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic copolymerizations include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, the disclosure of which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and U.S. Re. 27,145, the disclosure of each of which is incorporated herein by reference.

Polymerization conditions to prepare the block copolymers of the present invention are typically similar to those used for anionic polymerizations in general. The polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably under nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent,
2) to enhance the thermal stability of the living polymer chain end which permits polymerization at higher temperatures and again, reduces the viscosity of the polymer solution allowing for the use of less solvent, and
3) to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. No. 6,391,981, U.S. Pat. No. 6,455,651 and U.S. Pat. No. 6,492,469, the disclosure of each of which is herein incorporated by reference. Related information is disclosed in U.S. Pat. No. 6,444,767 and U.S. Pat. No. 6,686,423, the disclosure of each of which is incorporated herein by reference. The polymer made by such a moderated, anionic polymerization process can have the same structure as one prepared using the conventional anionic polymerization process and as such, this process can be useful in making the polymers of the present invention. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) polymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents is known in the art and can be used in preparing the block copolymers. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949 and U.S. Pat. No. 4,444,953; as well as CA 716,645, the disclosure of each of which is incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and X is the remnant or residue of a coupling agent.

3. Process to Prepare Hydrogenated Block Copolymers

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the block copolymer to remove any ethylenic unsaturation prior to sulfonation. Hydrogenation generally improves thermal stability, ultraviolet light stability, oxidative stability, and, therefore, weatherability of the final polymer, and reduces the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. No. 3,595,942, U.S. Pat. No. 3,634,549, U.S. Pat. No. 3,670,054, U.S. Pat. No. 3,700,633, and U.S. Re. 27,145, the disclosure of each of which is incorporated herein by reference. These methods operate to hydrogenate polymers containing ethylenic unsaturation and are based upon operation of a suitable catalyst. Such a catalyst, or catalyst precursor, preferably comprises a Group 8 to 10 metal such as nickel or cobalt which is combined with a suitable reducing agent such as an aluminum alkyl or hydride of a metal selected from Groups 1, 2 and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds are reduced, and between zero and 10 percent of the arene double bonds are reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen and nitrogen. Care must be exercised in this step to avoid that an explosive mixture of oxygen and hydrocarbons is formed.

4. Process to Make Sulfonated Polymers

According to the multiple embodiments disclosed herein, the above prepared block copolymers are sulfonated to obtain a sulfonated polymer product that is in solution and in micellar form. In this micellar form, the sulfonated block copolymer can be neutralized prior to casting a membrane, and at the same time, the risk of gelling and/or precipitation of the sulfonated block copolymer while in solution is reduced.

Without being bound by any particular theory, it is the present belief that the micelle structure of the sulfonated block copolymer can be described as having a core comprising the sulfonated block or blocks having a substantial amount of spent sulfonating agent residues which is surrounded by the sulfonation resistant block or blocks which, in turn, are swollen by an organic non-halogenated aliphatic solvent. As will be further described in more detail below, the sulfonated blocks are highly polar due to the presence of sulfonic acid and/or sulfonate ester functional groups. Accordingly, such sulfonated blocks are sequestered into a core, while the outer sulfonation resistant blocks form a shell which is solvated by a non-halogenated aliphatic solvent. In addition to forming discrete micelles, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

Micelles can be formed as a result of the sulfonation process, or alternatively, the block copolymer may arrange in a micelle structure prior to sulfonation.

In some embodiments, for the formation of micelles, the sulfonation processes as described in WO 2008/089332 may be employed. The methods are useful for preparing sulfonated styrenic block copolymers as described in US 2007/021569.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

a) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates allow that the sulfonation of the polymer proceeds essentially without disabling gelling at considerably higher concentration than can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach may improve the utility of more polar sulfonation reagents. Such acyl sulfates are further described below.

b) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted depends upon the composition of the starting polymer, since the limiting concentration below which polymer gelling is non-disabling or negligible depends upon the polymer composition. As stated above, the limiting concentration may also be dependent on other factors such as the identity of the solvent or the solvent mixture used and the desired degree of sulfonation. Generally, the polymer concentration falls within the range of from about 1%-wt. to about 30%-wt., alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified mol percents even if the specific combination and range is not listed herewith.

In accordance with some embodiments of the presently described technology, the initial concentration of the precursor block polymer or mixture of precursor block polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified mol percents even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymer(s) in the reaction mixture may be above the limiting concentration of the precursor polymer.

c) Sulfonation Agent

According to multiple embodiments, acyl sulfate may be used for sulfonating the polymerized block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

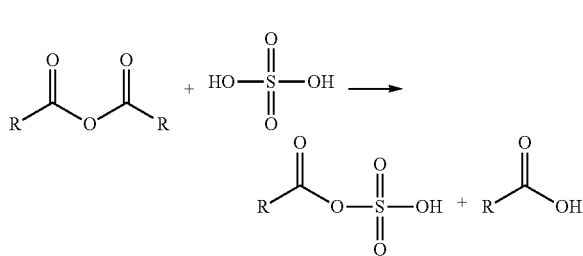

Acyl sulfates are subject to slow decomposition during the course of sulfonation reactions forming alpha-sulfonated carboxylic acids of the following formula:

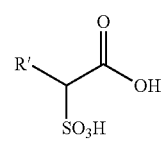

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. It will be understood by those skilled in the art that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

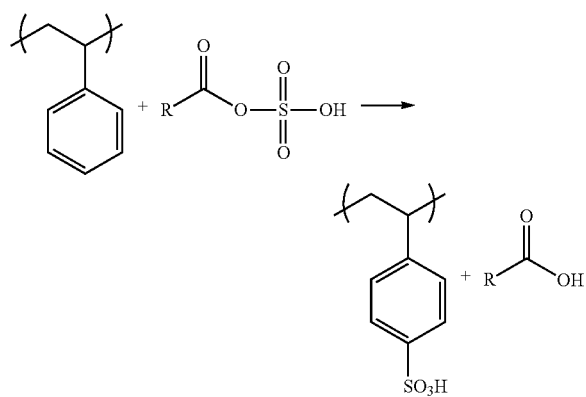

The acyl sulfate reagent that may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer (0.4 meq/g), alternatively greater than about 0.6 meq sulfonic acid per gram sulfonated polymer (0.6 meq/g), alternatively greater than about 0.8 meq sulfonic acid per gram sulfonated polymer (0.8 meq/g), alternatively greater than about 1.0 meq sulfonic acid per gram sulfonated polymer (1.0 meq/g), alternatively greater than about 1.4 meq sulfonic acid per gram sulfonated polymer (1.4 meq/g). For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percents even if the specific combination and range is not listed herewith.

The level or degree of sulfonation of a sulfonated polymer can be measured by NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkyl-carboxylic acid), and then to calculate the degree of styrene sulfonation based on mass balance. Alternatively, the level of sulfonation can be determined by titration of a dry polymer sample, which has been re-dissolved in tetrahydrofuran with a standardized solution of NaOH in a mixture of alcohol and water. In the latter case, rigorous removal of by-product acids are preferably ensured.

Although embodiments for sulfonating polymers are described above in the context of acyl sulfate reagents, the utility of other sulfonation reagents are also contemplated. For example, the use of those sulfonation reagents derived from the complexation/reaction of sulfur trioxides with phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphorous pentoxide, polyphosphoric acid, 1,4-dioxane, triethylamine, etc.

d) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

As a result of sulfonation, the micelle cores contain sulfonation susceptible blocks having sulfonic acid and/or sulfonate ester functionality which are surrounded by an outer shell containing sulfonation resistant blocks of the block copolymer. The driving force for this phase segregation (causing the micelle formation) in solution has been attributed to the considerable difference in polarity between the sulfonated block(s) and the non-sulfonated blocks of the sulfonated block copolymer. The latter blocks are freely solvable by a non-halogenated aliphatic solvent, for example the first solvent disclosed above. On the other hand, the sulfonated polymer block(s) may arrange to concentrate in the core of micelle.

e. Storage and Stabilization of Polar Components

The micellar solution of the sulfonated block copolymer having at least one end block A and at least one interior block B wherein each block A contains essentially no sulfonic acid or sulfonate ester functional groups and each block B is a polymer block containing from about 10 to about 100 mol % sulfonic acid or sulfonate ester functional groups based on the number of monomer units present in the block B in a one non-polar liquid phase has surprisingly been found to be stable in the presence of a polar component. In fact, the micellar solution of the sulfonated block copolymer has been found to "react" with the polar component without collapsing the micellar structure. Instead, the polar component has been found to be immured by the micelles of the sulfonated block copolymer in the non-polar liquid phase, thereby storing and/or stabilizing the polar compound in the non-polar liquid phase.

In one embodiment, a micellar solution of the sulfonated block copolymer and a non-polar, liquid phase which is adapted for storing and/or stabilizing a polar component is obtained by dissolving a sulfonated block copolymer having at least one end block A and at least one interior block B wherein each block A contains essentially no sulfonic acid or sulfonate ester functional groups and each block B is a polymer block containing from about 10 to about 100 mol % sulfonic acid or sulfonate ester functional groups based on the number of monomer units present in the block B in a one non-polar liquid phase.

In some embodiments, the non-polar, liquid phase is formed by one or more aprotic apolar solvents which are preferably non-halogenated. Illustrative examples include hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In particular embodiments, the non-polar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane.

In further embodiments, the non-polar liquid phase is formed by at least two aprotic solvents each of which is preferably non-halogenated. In further particular embodiments, the non-polar liquid phase comprises at least one solvent selected from hexanes, heptanes and octanes and mixtures thereof, with cyclohexane and/or methylcyclohexane.

The concentration of the sulfonated block copolymer in the non-polar liquid phase depends upon the composition of the sulfonated block polymer, since the limiting concentration below which polymer gelling is non-disabling or negligible depends upon the polymer composition. As stated above, the limiting concentration may also be dependent on other factors such as the identity of the solvent or the solvent mixture. Generally, the polymer concentration falls within the range of from about 1%-wt. to about 30%-wt., alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified mol percents even if the specific combination and range is not listed herewith.

The dissolution of the sulfonated block copolymer in the non-polar, liquid phase to obtain the micellar solution is achieved, for example, by combining requisite amounts of the sulfonated block copolymer and the solvent or solvents at a temperature of from about 20° C. to the boiling point of the employed solvent or solvents. In general, the dissolution temperature is in a range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The dissolution time can be in the range of from approximately less than 1 minute to approximately 24 hours or longer, dependent on the temperature of the mixture.

Alternatively, the micellar solution of the sulfonated block copolymer may be prepared by sulfonating a corresponding block copolymer precursor in the manner described in the foregoing.

Suitable polar components for inclusion in the sulfonated polymer core of the micelle include, for example, metal compounds and/or metal salts, in particular compounds and/or salts of metals of groups 1 to 14 of the Periodic Table of the Elements. Illustrative metal compounds and/or salts include, for example, the compounds and/or salts of lithium(I), sodium(I), gold(I), and cobalt(II), rhodium(II), iridium(II), nickel(II), palladium(II), platinum(II), zinc(II), iron(II), magnesium(II), calcium(II) and copper(II) as well as aluminum (III), iron(III), lead(IV) and titanium(IV).

Other suitable polar components that may be usefully immured in the core of the sulfonated polymer micelle include, for example, active compounds such as pharmaceutically active agents, agents employed in agriculture, dyes, ignition and flame retardant compounds, materials having conducting properties, and agents having specific optical properties. Polar materials having absorptive properties might be contained in the core of the sulfonated polymer micelles, as well. Optionally, these materials may be present in a salt form.

The polar component may be added to the micellar solution of the sulfonated block copolymer "in substance" or may be added in form of a mixture, dispersion or solution with a solvent. The solvent which may be employed to mix, disperse or dissolve the polar component is generally not critical. In some embodiments, the solvent may be water or may be an organic solvent. Organic solvents in this context may be protic or aprotic, including aprotic-polar solvents and aprotic apolar solvents and mixtures of two or more solvents of the same or different nature.

The amount of polar component which may be added to the micellar solution of the sulfonated block copolymer depends on the nature of the polar compound, on the nature and composition of the solvent or solvents, and on the nature and degree of sulfonation of the sulfonated block copolymer. In some embodiments, the polar component may be added to the micellar solution of the sulfonated block copolymer in amounts of from 0.01 to 100%-wt. based on the amount of the sulfonated block copolymer. In further embodiments, the polar component may be added to the micellar solution of the sulfonated block copolymer in amounts of at least 0.05, preferably at least 0.1, and more preferably at least 1%-wt. of the sulfonated block copolymer. In still further embodiments, the polar component may be added to the micellar solution of the sulfonated block copolymer in amounts of at most 80, preferably at most 65, and more preferably at most 50%-wt. of the sulfonated block copolymer. It will be understood by those skilled in the art that suitable ranges of amounts include any combination of the specified limit values even if the combination and range is not specifically listed herewith.

5. Process to Neutralize Sulfonated Polymers

In general, the sulfonated block copolymers are neutralized by providing a solution of the non-neutralized block copolymer and an organic solvent and adding at least one compound of a metal having an atom number of at least 11 to the solution with the metal compound acting as a base relative to the acidic functionality of the block copolymer.

In accordance with some embodiments, the solution of the non-neutralized block copolymer may be the reaction mixture which is obtained after sulfonating the block copolymer in the afore-described manner. In other embodiments, the solution of the non-neutralized block copolymer can be provided by dissolving a sulfonated block copolymer in an organic solvent. When a sulfonated block copolymer is dissolved in a solvent, it is possible to utilize a raw sulfonation product solution as it is generated in the sulfonation reactor. It will be understood by those skilled in the art that it is equally possible to employ a sulfonated block copolymer which has been isolated from the sulfonation reaction mixture, and has been washed or otherwise purified, and/or has been dried. However, such measures generally have not been found to be necessary and considerations such as process economy may render such measures undesirable.

The organic solvent or solvents suitable for providing the solution of the non-neutralized block copolymer generally include all solvent and solvent mixtures which are suited to substantially dissolve the non-sulfonated polymer blocks or to disperse them into solvated micelles. As such, the solvents may be selected from aprotic polar or apolar organic solvents such as optionally partially or fully halogenated (hydro)carbons, optionally halogenated esters, optionally halogenated ethers and the like. In particular embodiments with a view to environmental considerations, the organic solvent or solvents are non-halogenated aprotic polar or apolar solvents. In some of the preferred embodiments, the solvent or solvents are aprotic and apolar, for example, straight-chain, branched and cyclic hydrocarbons having from 5 to 15, or from 5 to 12, or from 6 to 12, carbon atoms such as n-pentane, iso-pentane, cyclopentane, methyl-cyclopentane, n-hexane, iso-hexane, cyclohexane, methyl-cyclohexane, n-heptane, iso-heptane, and the like.

The concentration of the sulfonated block copolymer in the organic solvent or solvents is generally adjusted so that gelling of the provided solution is avoided. Normally, the concentration at which gelling may occur will depend upon the nature of the sulfonated block copolymer, including the degree of sulfonation thereof, and upon the selected solvent or solvent mixture. Generally, the polymer concentration may be within the range of from about 1%-wt. to about 30%-wt., alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified mol percents even if the specific combination and range is not listed herewith.

In particular embodiments of the neutralization process, the solution of the sulfonated block copolymer in the organic solvent comprises the non-neutralized block copolymer in a micellar form as addressed in the foregoing sections.

The sulfonated block copolymer is neutralized by adding at least one compound of a metal having an atom number of at least 11 to the optionally micellar solution of the sulfonated block copolymer. The expression "metal" as used in this context is meant to refer to an element which is understood in the art as a metal, and is meant to specifically exclude those elements which are understood in the art as semi-metallic elements. Semi-metallic elements are in their elemental state not malleable or ductile and are neither good conductors nor good insulators such as boron, silicon, germanium antimony, tellurium, polonium and astatine, all of which are understood by those skilled in the art to be semimetals. As such, the expression "metal" as used in the context of this aspect essentially encompasses all elements having an atom number of at least 11 and being listed in the Periodic Table of the Elements to the left of, or below, the afore-mentioned semi-metallic elements.

In some embodiments, the metal is selected from the metals of periods 3, 4, 5 or 6 of the Periodic Table of the Elements. In other embodiments, the metal is selected from groups 2 to 14 of the Periodic Table of the Elements. In particular embodiments, the metal is selected from among the metals of periods 3 through 6 and groups 2 to 14. Representative metals of period 3 are sodium, magnesium and aluminum. Representative metals of period 4 are potassium, calcium, scandium, titanium, vanadium, chromium, manganese, iron, cobalt, nickel, copper, zinc and gallium. Representative metals of period 5 are strontium, zirconium, molybdenum, ruthenium, rhodium, palladium, silver, cadmium and tin. Representative metals of period 6 are barium, hafnium, platinum, gold, mercury and lead.

In further embodiments, the metal is selected from the metals of groups 2, 4, 6, 11, 12, 13 and 14. Representative metals of group 2 are magnesium, calcium, strontium and barium. Representative metals of group 4 are titanium, zirconium and hafnium. Representative metals of group 6 are chromium, molybdenum and tungsten. Representative metals of group 11 are copper, silver and gold. Representative metals of group 12 are zinc, cadmium and mercury. Representative metals of group 13 are aluminum, gallium, indium and thallium. Representative metals of group 14 are tin and lead. In particular embodiments the metal is selected from among the metals of periods 3 to 6 and groups 2, 4, 6, 11, 12, 13 and 14.

In still further embodiments, the metal is sodium, potassium, cesium, magnesium, calcium, strontium, barium, aluminum, tin, lead, titanium, zirconium, vanadium, chromium, molybdenum, manganese, iron, cobalt, nickel, copper, silver, zinc, cadmium, or mercury, in particular magnesium, aluminum, calcium, titanium, chromium, copper or zinc.

The metal is employed in the neutralization process in form of a compound with the metal being present in the compound in an oxidation state of at least +1. In some embodiments, the metal is present in the metal compound in an oxidation state of at most +4. In particular embodiments the metal is present in the compound in an oxidation state of +1, +2 or +3, or in an oxidation state of +2, +3 or +4. It will be understood by those skilled in the art that the metal compound may comprise a single metal in one or more oxidation states, and may comprise a combination of one or more metals having the same or different oxidation states.

A broad variety of metal compounds may be used according to the method so long as the metal compound is sufficiently soluble or dispersible in the solution of the non-neutralized block copolymer to ensure contact between the metal compound and the non-neutralized block copolymer and the metal compound reacts as a base in the presence of the acidic sites in the block copolymer. Suitable compounds include, for example, inorganic compounds such as halogenides, oxides, hydroxides, sulfides, sulfites, sulfates, nitrates, phosphates, carbonates, hydrogencarbonates, borates, hydrides and the like; organic compounds such as formates, carboxylates, alcoholates, and so called "organometal compounds," i.e., metal compounds which comprise hydrocarbyl groups, and the like; as well as compounds comprising inorganic as well as organic moieties such as, for example, organometal halogenides.

Suitable compounds include in particular those compounds in which the metal is present in combination with at least one group which forms a weaker coordination with the metal than the coordination between the metal and the sulfonic acid or sulfonate ester group of the sulfonated block copolymer. It will be understood by those skilled in the art that the nature of the metal may determine whether the coordination of the metal to the group in question is weaker than the coordination of the metal to the sulfonic acid or sulfonate ester group of the sulfonated block copolymer.

Suitable compounds also include in particular those compounds in which the metal is present in combination with at least one group capable of reacting with a proton of the sulfonic acid or with the sulfonate ester group of the sulfonated block copolymer to form a more stable coordination or bond than with the metal. For example, a hydride or an organyl group may react with a proton to form hydrogen or an organic compound. Similarly, a carbonate or hydrogencarbonate may form carbon dioxide and water under the influence of protons, and an oxide or hydroxide may form water under the influence of protons.

In some embodiments the metal compound comprises at least one group such as oxide, hydroxide, alcoholate, formate, carbonate, hydrogencarbonate or carboxylate. Alcoholate groups generally have at least one and may have up to eight carbon atoms with the hydrocarbon moiety being straight-chain, branched, cyclic or a combination thereof. Illustrative examples of such alcoholate groups include methoxylate, ethoxylate, n-propoxylate, iso-propoxylate, ethylhexyloxylate, cyclohexyloxylate, methylcyclohexyloxylates and the like. Carboxylate groups generally have at least two and may have up to eight carbon atoms with the hydrocarbon moiety being straight-chain, branched, cyclic or a combination thereof. Illustrative examples of such carboxylate groups include acetate, n-propionate, iso-propionate, ethylhexanoate, stearate, cyclohexylcarboxylate, methylcyclohexylcarboxylates, and the like.

In other embodiments the metal compound comprises at least one hydride or hydrocarbyl group. Hydrocarbyl groups of such compounds generally have at least one and up to ten, or up to eight, or up to six, carbon atoms and may be straight-chain, branched, cyclic or a combination thereof. Illustrative examples include methyl, ethyl, n- and iso-propyl, n-, iso- and tert-butyl, n-, iso-, neo- and cyclopentyl, n-, iso-, neo- and cyclohexyl, phenyl, tolyl, and the like.

Ease of handling of the metal compound as well as economic considerations may govern the choice of the metal compound. Accordingly, metal compound such as oxides, hydroxides, alcoholates, formates, carbonates, hydrogencarbonates, carboxylates and the like may be preferred.

Additionally and with a view to an economic purification of the neutralized sulfonylated block copolymer as a material for membranes, for example, it may be preferred to employ a metal compound which comprises groups that allow an easy purification of the product, i.e., groups which react to form compounds that are easily separated such as hydrogen, carbon dioxide, hydrocarbons, alcohols, carboxylic acids, etc. It will be understood by those skilled in the art how to balance any draw-backs and benefits in handling of the metal compound and in process economy.

The amount of the metal compound which is employed for neutralizing the sulfonated block copolymer depends upon the moles of sulfonic acid or sulfonate ester groups present in the sulfonated block copolymer and on the desired level of neutralization. When the amount of metal compound is less than about 80% of the stoichiometric amount with respect to the sulfonic acid or sulfonate ester groups present in the sulfonated block copolymer, the metal compound will normally react quantitatively. For levels of neutralization above about 80%, it has been found to be advantageous to employ the metal compound in excess. Normally, the amount of metal compound may be employed in amounts ranging from about 50% to about 2000% of the stoichiometric amount with respect to the sulfonic acid or sulfonate ester functionalities of the sulfonated block copolymer.

In some embodiments the metal compound may be added in at least about 60%, particularly at least about 70%, more particularly at least about 80%, or at least about 100% of the stoichiometric amount with respect to the sulfonic acid or sulfonate ester groups present in the sulfonated block copolymer. Further, the metal compound may be added in at most about 1500%, particularly at most about 750%, more particularly at most about 500%, or at most about 250% or at most about 200%, of the stoichiometric amount with respect to the sulfonic acid or sulfonate groups present in the sulfonated block copolymer. It will be understood by those skilled in the art that suitable ranges include any combination of the specified stoichiometric amounts even if the specific combination and range is not listed herewith.

The amount of the metal compound which is employed for neutralizing the sulfonated block copolymer further depends upon the oxidation state of the metal. Without wanting to be bound by any particular theory, it is believed that one sulfonic acid or sulfonate ester group may be neutralized by one charge equivalent of the metal in the metal compound. Accordingly, a metal in an oxidation state of +1 may neutralize one sulfonic acid or sulfonate group, a metal in an oxidation state of +2 may neutralize two sulfonic acid or sulfonate ester groups, etc. Therefore, the aforementioned stoichiometric amounts of the metal compound are based on the charge equivalent of the metal in the metal compound.

The level of neutralization may be adjusted within broad ranges, e.g., from about 70% to about 100% of the sulfonic acid or sulfonate ester groups being neutralized by at least one charge equivalent to one mole of the metal compound per equivalent of sulfonic acid functionality in the block copolymer. In other embodiments the level of neutralization is at least about 80%, particularly at least about 85%, more particularly at least about 90% of the sulfonic acid or sulfonate ester groups being neutralized by at least one charge equivalent and up to one mole of the metal compound per equivalent of sulfonic acid functionality in the block copolymer. In some embodiments, at most about 95%, preferably at most about 98%, more particularly 100%, of the sulfonic acid or sulfonate ester groups are neutralized by at least one charge equivalent and up to one mole of the metal compound per equivalent of sulfonic acid functionality in the block copolymer.

In some of the embodiments, the level of neutralization may be higher where the non-neutralized block copolymer has a lower degree of sulfonation, e.g., where the degree of sulfonation of the non-neutralized block copolymer is in a range of from about 10 to about 70 mol %, the level of neutralization may be in a range of from 90 to 100%. In other embodiments, the level of neutralization may be lower where the non-neutralized block copolymer has a higher degree of sulfonation, e.g., where the degree of sulfonation of the non-neutralized block copolymer is in a range of about 65 to 100 mol %, the level of neutralization may be in a range of from about 75% to 100%. Higher levels of neutralization have surprisingly been found to reduce the tendency of the neutralized sulfonated block copolymer to swell when employed in an aqueous environment.

Generally, the metal compound may be added to the solution of the sulfonated block copolymer "in substance," or it may be added as a mixture, dispersion or solution with a solvent. The solvent which may be employed to mix, disperse or dissolve the metal compound is generally not critical. In some embodiments, the solvent may be water or may be an organic solvent. Organic solvents in this context may be protic or aprotic, including aprotic-polar solvents and aprotic apolar solvents and mixtures of two or more solvents of the same or different nature. It will be understood by those skilled in the art that some metal compound such as metal hydrides, organometal compounds and organometal halogenides may be hazardous in substance and may necessitate that the metal compound be handled in dispersed form, or as a solution, in an inert solvent or diluent. It is important that these metal compounds do not react with protic species in the solvent. In addition, it is important to note that many of these metal hydrides, organometal compounds and organometal halogenides react vigorously with oxygen and must be handled in the absence of oxygen. Under those circumstances it is therefore preferred that all due care be taken.

In one aspect of the neutralization process, and apart from restrictions due to otherwise hazardous conditions, the metal compound is added to the solution of the sulfonated block copolymer in substance.

In another aspect of the neutralization process, again apart from restrictions due to otherwise hazardous conditions, the metal compound is added to the solution of the sulfonated block copolymer as a mixture, dispersion or solution with water or with an organic solvent. In some embodiments of this aspect, the solvent is water or is a protic or aprotic-polar solvent such as an alcohol, e.g., methanol, ethanol, and the like; a carboxylic acid, e.g., formic acid, acetic acid, propionic acid, and the like, an ether, e.g., methyl-tert-butyl ether, tetrahydrofuran (THF), dioxan and the like, an ester, e.g., ethyl acetate and the like, a ketone, e.g., methyl-iso-butylketone (MIBK) and the like, a formamide, e.g., dimethylformamide (DMF) and the like, a sulfoxide, e.g., dimethylsulfoxide (DMSO) and the like. It will be understood by those skilled in the art that the solvent employed for mixing, dispersing or dissolving the metal compound may be a single solvent, i.e., water or one of the aforementioned organic protic or aprotic polar solvents or may be a combination of water and one or more organic solvents, or may be a combination of one or more organic solvents.

In still another aspect of the neutralization process, the solvent or solvents employed for mixing, dispersing or dissolving the metal compound(s) is(are) selected from the group of water, alcohols having from 1 to 4 carbon atoms, carboxylic acids having from 1 to 5 carbon atoms, and aprotic-polar and aprotic-apolar solvents. In some embodiments of this aspect, the solvent(s) is(are) selected from water, $C_1$-$C_4$-alcohols and $C_1$-$C_5$-carboxylic acids. In other embodiments of this aspect, the solvent(s) is(are) selected from aprotic-polar an aprotic-apolar solvents. In particular embodiments, the solvent(s) is(are) selected from aprotic-apolar non-halogenated solvents.

The neutralization reaction may normally be conducted at a temperature in the range of from −40° C. to the boiling point of the solvent or solvent mixture. The reaction may be exothermic, i.e., may increase the temperature of the reaction medium by about 10 to 20° C., depending on the nature of the metal compound, the amount per time in which the metal compound is added, and on the degree to which the block copolymer is sulfonated. In some of the embodiments, the temperature may be in the range of from about −40° C. to about +100° C., or from about 20° C. to about +60° C.

The metal compound, "in substance" or in mixture, dispersion or solution, and the solution of the sulfonated block copolymer may be combined by metering the metal compound into the solution of the sulfonated block copolymer, by metering the sulfonated block copolymer into the metal compound, with the metal compound being present in "in substance" or in mixture, dispersion or solution, preferably in mixture, dispersion or solution, or by metering the metal compound and the solution of the sulfonated block copolymer, simultaneously but separately, into a reaction medium. In some embodiments it is preferred to meter the metal compound, "in substance" or in mixture, dispersion or solution, and the solution of the sulfonated block copolymer may be combined by metering the metal compound into the solution of the sulfonated block copolymer.

It will be understood by those skilled in the art that the reaction time may be dependent upon the reaction temperature and the reactivity of the metal compound. The expression "reaction time" in this context is understood to be the interval of time starting when all of the reactants have been combined and ending when the neutralization reaction has reached completion. Generally, the reaction time may range from approximately less than 1 minute to approximately 24 hours or longer. Preferably, completion is reached within about 1 hour, or within 30 minutes.

The neutralized sulfonated block copolymer may be separated from the reaction mixture by evaporating the reaction solvent(s) optionally at a reduced pressure and optionally at an elevated temperature. In some embodiments, the reaction mixture comprising the neutralized sulfonated block copolymers may be used without further processing to cast films or membranes.

6. Properties of Neutralized Block Polymers

The metal neutralized sulfonated block copolymers as described herein possess unexpected and superior performance properties. On the one hand, it has been found that neutralizing the sulfonated block copolymers with the aforementioned metal compounds provides a reinforcing effect on the sulfonated block copolymers in the wet state. In other words, when immersed in water, the metal neutralized block copolymer exhibits a higher tensile modulus than a corresponding, non-neutralized sulfonated block copolymer in the wet state. On the other hand, when not immersed in water, the metal neutralized sulfonated block copolymers exhibit a dry tensile modulus which is essentially the same or is lower than the modulus of a corresponding, non-neutralized sulfonated block copolymer in the dry state. Therefore, according to some embodiments, the difference between the modulus of the metal neutralized block copolymer in the wet and the dry state is less than the difference between the modulus of the corresponding, non-neutralized block copolymer in the wet and the dry state. This has the advantage that the metal neutralized block copolymer is less likely to soften when introduced into, or when employed in, an aqueous environment than is the case with the corresponding, non-neutralized sulfonated block copolymer, rendering the metal neutralized sulfonated block copolymer significantly better suited for applications which require dimensional stability under wet conditions. A film or membrane cast from the metal neutralized sulfonated block copolymer will exhibit improved rigidity in a wet environment over its non-neutralized analog.

In some embodiments the metal neutralized sulfonated block copolymers have a wet tensile modulus which is equal to or less than that of the corresponding, non-neutralized sulfonated block copolymer. In other embodiments the wet tensile modulus is increased to a range of from 100% to over 500% of the tensile modulus of the corresponding, non-neutralized sulfonated block copolymer. In other embodiments, the wet tensile modulus is increased to the range of from 100% to over 1000% of the tensile modulus of the corresponding, non-neutralized sulfonated block copolymer. In further embodiments, the wet tensile modulus is increased to the range of from 100% to over 3000% of the tensile modulus of the corresponding, non-neutralized sulfonated block copolymer. In even further embodiments, the wet tensile modulus is increased to the range of from 200% to over 3000% of the tensile modulus of the corresponding, non-neutralized sulfonated block copolymer. It will be understood by those skilled in the art that suitable ranges include any combination of the specified percents even if the specific combination and range is not listed herewith.

In another aspect, the tensile modulus of the metal neutralized block copolymer may be the same or similar in both the wet and the dry state. Accordingly, in some embodiments, the metal neutralized block copolymer disclosed herein has a wet tensile modulus that is not less than 10% of the dry tensile modulus. In other embodiments, the wet tensile modulus is not less than 20% of the dry tensile modulus. In additional embodiments, the wet tensile modulus is not less than 40% of the dry tensile modulus. In other embodiments, the wet tensile modulus is not less than 100% of the dry tensile modulus. In other embodiments, the wet tensile modulus exceeds the dry tensile modulus of the metal neutralized sulfonated block copolymer. It will be understood by those skilled in the art that suitable ranges include any combination of the specified percents even if the specific combination and range is not listed herewith.

Furthermore, in some embodiments, the wet tensile strength at break of the metal neutralized block copolymer is at least about 40% of the dry tensile strength at break. In other embodiments, the wet tensile strength at break of the neutralized block copolymer is at least about 50% of the dry tensile strength at break. In further embodiments, the wet tensile strength at break of the neutralized block copolymer is at least about 75% of the dry tensile strength at break. In further embodiments, the wet tensile strength at break of the neutralized block copolymer is at about the same as the dry tensile strength at break. It will be understood by those skilled in the art that suitable ranges include any combination of the specified percents even if the specific combination and range is not listed herewith. It will be understood by those skilled in the art that the foregoing reference to minimum percents, in each case, includes embodiments in which the wet tensile strength exceeds the dry tensile strength.

Additionally and surprisingly it has been found that the metal neutralized sulfonated block copolymer described herein has advantageous water uptake properties. In some embodiments, the water uptake value of the metal neutralized sulfonated block copolymer is equal to or less than the water uptake value of a corresponding, non-neutralized block copolymer. In other embodiments the metal neutralized sulfonated block copolymer has a water uptake value of less than 80%, preferably less than 50%, still more preferably less than 20%, of the water uptake value of a corresponding, non-neutralized sulfonated block copolymer. In some embodiments, the metal neutralized sulfonated block copolymer has a water uptake value of about or less than 50%-wt., preferably about or less than 40%-wt., still more preferably about or less than 25%-wt., of its dry weight. The water uptake properties of the metal neutralized sulfonated block copolymers, also, render the neutralized block copolymer significantly improved with respect to dimensional stability in the wet state as compared with the corresponding non-neutralized sulfonated block copolymer.

Furthermore, in some embodiments, the water uptake value of the metal neutralized block copolymer may range from 5%-wt. to 100%-wt. In other embodiments, the water uptake value of the neutralized block copolymer may range from 20%-wt. to 75%-wt. In additional embodiments, the water uptake value of the neutralized block copolymer is from 20%-wt. to 50%-wt. In further embodiments, the water uptake value of the neutralized block copolymer is from 20%-wt. to 40%-wt. In still further embodiments, the water uptake value of the neutralized block copolymer is from 20%-wt. to 35%-wt. It will be understood by those skilled in the art that suitable ranges include any combination of the specified percents even if the specific combination and range is not listed herewith.

While the metal neutralized sulfonated block copolymers described herein take up some water in an aqueous environment, e.g., at least 0.1%-wt. based on the dry weight, it has surprisingly been found that the water uptake generally does not result in a noteworthy change in volume on wet/dry cycling. The surprising and advantageous dimensional stability is desirable in water management membranes, i.e., in applications where a membrane is constrained in a mounting device and small changes in the dimensions of the membrane may cause buckling and tearing, thereby inevitably causing the performance of the device to degrade or even fail. The surprising and advantageous dimensional stability is also desirable, for example, for desalination applications, humidity regulation devices, battery separators, fuel cell exchange membranes, medical tubing applications and the like.

Additionally and surprisingly, it has been found that the metal neutralized block copolymers disclosed herein have high water vapor transport rates while at the same time having very good dimensional stability. It was surprisingly found that the water vapor transport rate (WVTR) of the metal neutralized sulfonated block copolymers is the same or similar to the WVTR of a corresponding non-neutralized block copolymer, and in some embodiments may even exceed the WVTR of the corresponding, non-neutralized block copolymer. Accordingly, in some embodiments the WVTR of the metal neutralized sulfonated block copolymer is at least about 50% of the WVTR of a corresponding non-neutralized sulfonated block copolymer. In other embodiments, the WVTR is at least about 65% of the WVTR of a corresponding non-neutralized sulfonated block copolymer. In further embodiments, the WVTR is at least about 75% of the WVTR of a corresponding non-neutralized sulfonated block copolymer. In still further embodiments, the WVTR is at least about 85% of the WVTR of a corresponding non-neutralized sulfonated block copolymer. In even further embodiments, the WVTR is at least about 90% of the WVTR of a corresponding non-neutralized sulfonated block copolymer. In additional embodiments, the WVTR is at least about 95% of the WVTR of a corresponding non-neutralized sulfonated block copolymer. In further embodiments, the WVTR is at least about 99% of the WVTR of a corresponding non-neutralized sulfonated block copolymer. It will be understood by those skilled in the art that suitable ranges include any combination of the specified percents even if the specific combination and range is not listed herewith.

The WVTR of the metal neutralized sulfonated block copolymers may be quantified in terms of grams of water which are transported through a membrane, which is 1 mil thick and has an exposed surface area of 1 $m^2$, in a day ($g/m^2$/day/mil). In some embodiments, the metal neutralized sulfonated block copolymers as disclosed herein have a WVTR of at least about 15,000 $g/m^2$/day/mil. In other embodiments, the WVTR is at least about 18,000 $g/m^2$/day/mil. In further embodiments, the WVTR is at least about 20,000 $g/m^2$/day/mil. In even further embodiments, the WVTR is at least about 22,000 $g/m^2$/day/mil. In still further embodiments, the WVTR is at least about 23,000 $g/m^2$/day/mil. It will be understood by those skilled in the art that suitable ranges include any combination of the specified rates even if the specific combination and range is not listed herewith.

7. Applications of the Neutralized Block Copolymers

The neutralized sulfonated block copolymers may be compounded with other components not adversely affecting the copolymer properties. The neutralized block copolymers may be blended with a large variety of other polymers, including olefin polymers, styrene polymers, hydrophilic polymers and engineering thermoplastic resins, with polymer liquids and other fluids such as ionic liquids, natural oils, fragrances, and with fillers such as nanoclays, carbon nanotubes, fullerenes, and traditional fillers such as talcs, silica and the like.

Additionally, the neutralized sulfonated block copolymers may be blended with conventional styrene/diene and hydrogenated styrene/diene block copolymers, such as the styrene block copolymers available from Kraton Polymers LLC. Illustrative styrene block copolymers include linear S-B-S, S-I-S, S-EB-S, S-EP-S block copolymers. Also included are radial block copolymers based on styrene along with isoprene and/or butadiene and selectively hydrogenated radial block copolymers. Particularly useful are blends with the block copolymer precursor, the block copolymer prior to sulfonation.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially random ethylene/styrene copolymers, preferably containing at least 20, more preferably equal to or greater than 25%-wt. copolymerized styrene monomer.

Hydrophilic polymers include polymeric bases which are characterized as having an available pair of electrons for interaction with acids. Examples of such bases include polymeric amines such as polyethyleneamine, polyvinylamine, polyallylamine, polyvinylpyridine, and the like; polymeric analogs of nitrogen containing materials such as polyacrylamide, polyacrylonitrile, nylons, ABS, polyurethanes and the like; polymeric analogs of oxygen containing compounds such as polymeric ethers, esters, and alcohols; and acid-base hydrogen bonding interactions when combined with glycols such as polyethylene glycol, and polypropylene glycol, and the like, polytetrahydrofuran, esters (including polyethylene terephthalate, polybutyleneterephthalate, aliphatic polyesters, and the like), and alcohols (including polyvinylalcohol), poly saccharides, and starches. Other hydrophilic polymers that may be utilized include sulfonated polystyrene. Hydrophilic liquids such as ionic liquids may be combined with the polymers of the present invention to form swollen conductive films or gels. Ionic liquids such as those described in U.S. Pat. No. 5,827,602 and U.S. Pat. No. 6,531,241 (which disclosures are herein incorporated by reference) may be introduced into the neutralized sulfonated polymers either by swelling a previously cast membrane, or by adding to the solvent system before casting a membrane, coating a film or forming a fiber.

Illustrative materials that may be used as additional components include, without limitation: (1) pigments, antioxidants, stabilizers, surfactants, waxes, and flow promoters; (2) particulates, fillers and oils; and (3) solvents and other materials added to enhance processability and handling of the composition.

Pigments, antioxidants, stabilizers, surfactants, waxes and flow promoters, when utilized in combination with the neutralized sulfonated block copolymers may be included in amounts up to and including 10%-wt., i.e., from 0 to 10%, based on the total weight of the composition. When any one or more of these components are present, they may be present in an amount from about 0.001 to about 5%-wt., and more preferably from about 0.001 to about 1%-wt.

Particulates, fillers and oils may be present in an amount up to and including 50%-wt., from 0 to 50% based on the total weight of the composition. When any one or more of these components are present, they may be present in an amount from about 5 to about 50%-wt., preferably from about 7 to about 50%-wt.

It will be understood by those having ordinary skill in the art that the amount of solvents and other materials added to enhance processability and handling of the composition will in many cases depend upon the particular composition formulated as well as the solvent and/or other material added. Typically such amount will not exceed 50%, based on the total weight of the composition The metal neutralized sulfonated block copolymers described herein can be employed in a variety of applications and end uses, and their property profile renders them particularly suited as materials in applications which require high modulus when immersed in water, good wet strength, good dimensional stability, good water and proton transport characteristics, good methanol resistance, easy film or membrane formation, good barrier properties, controlled flexibility and elasticity, adjustable hardness, and thermal/oxidative stability.

In one embodiment of the present invention, the metal neutralized sulfonated block copolymers may be used in electrochemical applications, such as in fuel cells (separator phase), proton exchange membranes for fuel cells, dispersions of metal impregnated carbon particles in sulfonated polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The metal neutralized sulfonated block copolymers are also used as desalination membranes, and in coatings on porous membranes. Their selectivity in transporting gases makes them useful for gas separation applications. Additionally, the metal neutralized sulfonated block copolymers are used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics may protect first responders at the scene of an emergency where exposure to smoke, a chemical spill, or various chemical or biological agents are a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported in U.S. Pat. No. 6,537,538, U.S. Pat. No. 6,239,182, U.S. Pat. No. 6,028,115, U.S. Pat. No. 6,932,619 and U.S. Pat. No. 5,925,621 where it is noted that polystyrene sulfonates act as inhibitory agents against HIV (human immunodeficiency virus) and HSV (herpes simplex virus. In personal hygiene applications, a membrane or fabric of the present invention that would transport water vapor from perspiration while providing a barrier to the escape of other bodily fluids and still retain its strength properties in the wet environment would be advantageous. The use of these types of materials in diapers and adult incontinence constructions would be improvements over existing technologies.

Accordingly, in some embodiments, the metal neutralized sulfonated block copolymers described herein are particularly employed as materials for water vapor transporting membranes which are employed in wet or aqueous environments. Such membranes are, for example useful in devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, and batteries.

8. Examples

The following examples are intended to be illustrative only, and are not intended to be, nor should they be construed as, limiting the scope of the present invention in any way.
a. Materials and Methods
The tensile modulus in the dry state as described herein was measured according to ASTM D412.
The tensile modulus in the wet state as described herein was measured similar to the method according ASTM D412 using samples that had been equilibrated under water for a period of 24 hours prior to testing, and that were fully submerged under water for testing.

All tensile data were collected in a climate controlled room at 74° F. (23.3° C.) and 50% relative humidity.

The WVTR as described herein was measured similar to ASTM E 96/E96M. The ASTM method was modified by using a smaller vial, employing 10 ml of water, and having an area of exposed membrane of 160 mm$^2$ (as opposed to 1000 mm$^2$ according to the ASTM method). After adding the water and sealing the vial with the membrane test specie, the vial was inverted, and air having a temperature of 25° C. and a relative humidity of 50% was blown across the membrane. Weight loss was measured versus time, and the water transport rate was calculated on the basis of the measurements as g/m$^2$, or as g mil/m$^2$ when normalized for thickness of the tested membrane.

The degree of sulfonation as described herein and as determined by titration was measured by the following potentiometric titration procedure. The non-neutralized sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by $^1$H-NMR was measured using the following procedure. About two (2) grams of non-neutralized sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-d$_8$ (THF-d$_8$), to which was then added with a partial drop of concentrated H$_2$SO$_4$ to shift interfering labile proton signals downfield away from aromatic proton signals in subsequent NMR analysis. The resulting solution was analyzed by $^1$H-NMR at about 60° C. The percentage styrene sulfonation was calculated from the integration of $^1$H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butyl styrene aromatic protons.

The ion exchange capacity as described herein was determined by the potentiometric titration method described above and was reported as milliequivalents of sulfonic acid functionality per gram of sulfonated block copolymer.

The formation of micelles was confirmed by particle size analysis on a Malvern Zetasizer Nano Series dynamic light scattering instrument, model number ZEN3600, available from Malvern Instruments Limited, UK, using polymer sample solutions diluted to a concentration of about 0.5 to 0.6%-wt. with cyclohexane. The diluted polymer solution samples were placed in a 1 cm acrylic cuvette and subjected to the instrument's general purpose algorithm for determination of size distribution as a function of intensity (see A. S. Yeung and C. W. Frank, Polymer, 31, pages 2089-2100 and 2101-2111 (1990)).

b. Experiments (I) Preparation of Non-Neutralized Sulfonated Block Copolymer SBC-1

A pentablock copolymer having the configuration A-D-B-D-A was prepared by sequential anionic polymerization where the A blocks are polymer block of para-tert-butylstyrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene and had a molecular weight of 28,000 g/mol. To this solution was added another aliquot of isoprene monomer to obtain an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS was then hydrogenated using a standard Co$^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride). The resulting polymer was found, by potentiometric titration, to have an "Ion Exchange Capacity (IEC)" of 2.0 meq of —SO$_3$H/g of polymer. The solution of sulfonated polymer had a solids level of about 10% wt/wt in a mixture of heptane, cyclohexane, and ethyl i-butyrate.

(II) Neutralization of Micellar Solution with Triethylaluminum

A 100 g aliquot of the solution obtained in (I) (10 g polymer, 20 meq of —SO$_3$H) was diluted with an additional 40 g of cyclohexane. In an inert atmosphere, triethylaluminum (13.84 g, 20 mmol) was added dropwise to the stirred sulfonated copolymer solution. An exotherm of 20° C. was observed. The resulting solution was exposed to the atmosphere.

(III) Neutralization of Micellar Solution with Metal Compounds

The procedure in (II) was repeated using the following metal compounds in the following amounts instead of triethylaluminum:

| | Metal Compound | SO₃H/Metal | Metal Solution (g) | Polymer Solution (g) |
|---|---|---|---|---|
| a | Triethylaluminum 1.0M in hexanes | 1 eq./1 eq. | 4.19 | 100 |
| b | sec-Butyllithium 1.4M in cyclohexane | 1 eq./1 eq. | 11.1 | 100 |
| c | Diethylzinc 1.0M in hexanes | 1 mole/1 eq. | 14.5 | 100 |
| d | Diethylzinc 1.0M in hexanes | 1 eq./1 eq. | 7.26 | 100 |

(IV) Casting of Membranes

A 20 mil thick casting of each of the neutralized polymer solutions obtained in (II), (III.a), (III.b), (III.c), (III.d), and of the solution obtained in (I) was drawn onto a 16"×16" silicanized glass plate. Each plate was allowed to dry overnight in a casting chamber at 1 atmosphere, relative humidity of 50%, and room temperature (about 23° C.) affording membranes that were a little over one mil thick.

(V) Neutralization of Membranes Made from Sulfonated Block Copolymer

The non-neutralized sulfonated block copolymer solution obtained in (I) was cast into a membrane as described in (IV). This membrane was cut up into several strips. These strips of film were separately placed into plastic bags containing an excess of the following solutions of sodium hydroxide in deionized (D.I.) water:

| Experiment Identity | Concentration of NaOH Solution (mol/l) |
|---|---|
| a | 1.0 |
| b | 0.1 |
| c | 0.01 |
| d | 0.001 |

The samples were stored in contact with the NaOH solutions for a week in the dark. The resulting neutralized membranes were evaluated using the wet tensile test procedure described above. The performance properties of these materials are reported below in Table 2. A control sample was prepared by soaking a sample of the starting membrane in deionized water for a week. "Dry Tensile" analyses used samples which had been soaked for a week, rinsed with deionized water, and dried under vacuum at 50 C.

c) Results and Discussion

Aluminum neutralized polymer solutions (II and III.a) and zinc neutralized polymer solutions (III.c and III.d) could be readily cast into uniform membranes using the same techniques as for casting a membrane from the solution of the non-neutralized sulfonated block copolymer (I). The lithium neutralized polymer solution (III.b) could not readily be cast into uniform membranes under these conditions. The membranes obtained by casting the lithium neutralized block copolymer were mottled in appearance and afforded a bumpy surface.

The data pertaining to the mechanical properties of representative membranes are compiled in the following Tables 1 (samples neutralized in micellar solution and then cast into membranes) and 2 (samples neutralized after membrane formation):

TABLE 1

Wet and Dry Tensile Performance for Membranes Prepared From Neutralization of Micellar Solutions Which Were Subsequently Cast Into Membranes.

| Membrane as Identified in Sect. I to V | Sample Condition[a] | Stress at Break (psi) | Strain at Break (%) | Strain at Yield (%) | Stress at Yield (psi) | Modulus (psi) |
|---|---|---|---|---|---|---|
| (I) | Dry | 2,400 | 270 | 45 | 1,800 | 66,000 |
| Control | Wet | 1,200 | 260 | no yield | no yield | 3,100 |
| (II) | Dry | 1,400 | 4 | 3.2 | 1,200 | 53,000 |
| 1 mol Al | Wet | 1,200 | 2 | 1.5 | 1,200 | 94,000 |
| (III.a) | Dry | 1,700 | 39 | 5.9 | 1,900 | 46,000 |
| 1 eq. Al | Wet | 830 | 230 | 11 | 480 | 13,000 |
| (III.b)[1] | Dry | 580 | 74 | 4.9 | 600 | 20,000 |
| 1 eq. Li | Wet | 230 | 60 | 8.4 | 170 | 4,300 |
| (III.b)[2] | Dry | 850 | 82 | 5 | 1,100 | 37,000 |
| 1 eq. Li | Wet | 600 | 250 | 56 | 260 | 2,100 |
| (III.c) | Dry | 1,900 | 59 | 4.1 | 2,500 | 11,000 |
| 1 mol Zn | Wet | 1,100 | 260 | 6 | 560 | 25,000 |
| (III.d) | Dry | 1,200 | 48 | 6.1 | 1,500 | 48,000 |
| 1 eq. Zn | Wet | 860 | 250 | 19.8 | 440 | 6,500 |
| (V.a) | Dry | 1,700 | 11 | 10 | 1,700 | 36,000 |
| 1M NaOH | Wet | 780 | 160 | 35 | 480 | 7,500 |

[a]Sample Condition at Time of Tensile Test

TABLE 2

Wet and Dry Tensile Performance for Membranes Prepared by Contacting an Already Cast Membrane of Non-neutralized Sulfonated Block Copolymer With a Solution (0.001 to 1M) of NaOH in Water.

| Membrane as Identified in Sect. I and V | Sample Condition[a] | Stress at Break (psi) | Strain at Break (%) | Strain at Yield (%) | Stress at Yield (psi) | Modulus (psi) |
|---|---|---|---|---|---|---|
| (I) | Dry | 1,300 | 130 | 7.2 | 1,400 | 36,000 |
| Control D.I. Water | Wet | 560 | 160 | 20 | 230 | 2,300 |
| (V.a) | Dry | 1,700 | 11 | 10 | 1,700 | 36,000 |
| 1M NaOH | Wet | 780 | 160 | 35 | 480 | 7,500 |
| (V.b) | Dry | 1,700 | 79 | 11 | 1,700 | 34,000 |
| 0.1M NaOH | Wet | 800 | 160 | 31 | 480 | 7,500 |
| (V.c) | Dry | 1,700 | 26 | 10 | 1,700 | 36,000 |
| 0.01M NaOH | Wet | 780 | 170 | 78 | 580 | 5,400 |
| (V.d) | Dry | 1,800 | 24 | 10 | 1,800 | 33,000 |
| 0.001M NaOH | Wet | 580 | 95 | 17 | 400 | 8,000 |

[a]Sample Condition at Time of Tensile Test

The data compiled in Tables 1 and 2 illustrate the effect of neutralization on the mechanical properties of the membranes. The effect was most notable after the membranes had been equilibrated in water (wet condition). Notably, membrane (II) which was obtained using 1 mole of aluminum reagent per equivalent of sulfonic acid functionality in the polymer did not soften on contact with water (see Table 1). A similar improvement of the mechanical properties, albeit less pronounced, was observed when the amounts of aluminum were reduced (III.a) or when zinc was employed instead of aluminum (III.c and III.d).

Neutralization of the sulfonated block copolymer with the monovalent ions Li+ and Na+ also had a reinforcing effect on the membranes in the presence of water; albeit to a lesser extent. Unlike the control membrane (I), the membranes cast from solutions that had been neutralized with Li+ had a well defined yield event at low elongation in the wet tensile test. These materials were higher in modulus when wet than was the control membrane. However, the membranes modified with Li+ and Na+ ions were less resistant to water than the membranes which had been obtained from sulfonated block copolymers that had been neutralized with the multivalent ions. Nonetheless, the monovalent ion neutralized materials gave better mechanical performance in water than did the control membrane (I).

It was found that membranes cast from the sulfonated block copolymer in the non-neutralized sulfonic acid form increased significantly in weight when immersed in water; this increase in weight was taken as a measure of swelling in the presence of water. Moreover, the increase in weight was found to be directly related to an increase in the dimension of the membrane, i.e., membranes obtained from the non-neutralized sulfonated block copolymers exhibit a tendency to swell under the influence of water. In contrast thereto and surprisingly, the membranes obtained from the sulfonated block copolymers which had been neutralized with a metal compound wherein the metal has an atom number of at least 11 exhibited considerably less swelling when equilibrated with water and, based upon that result, had improved dimensional stability, as well.

The aluminum and zinc neutralized membranes (II, III.a, III.c and III.d) surprisingly exhibited superior dimensional stability. These membranes took up about 30% of their weight in water at equilibrium when immersed in water. However, within the errors of the measurement, the dimensions of these membranes were the same under both wet and dry conditions, i.e., the respective membranes did not undergo a change in volume upon repeated wet/dry cycling.

The lithium neutralized membranes (III.b) were clearly inferior in this test. Also, as noted above, the lithium neutralized sulfonated block copolymers did not afford membranes that were uniform in appearance, and the membranes were weak in the tensile test.

The data pertaining to the water uptake and water vapor transport properties of representative membranes are compiled in the following Tables 3 and 4:

TABLE 3

Water Vapor Transport Rates and Swelling Data for Membranes Prepared From Neutralization of Micellar Solutions Which Were Subsequently Cast Into Membranes.

| Membrane as Identified in Sect. I to V | | WVTR (g/m$^2$/day/mil) | Swelling (% uptake) |
|---|---|---|---|
| (I) | Control | 24,000 | 140 |
| (II) | 1 mol Al | 22,000 | 29 |
| (III.a) | 1 eq. Al | 22,000 | 32 |
| (III.b)[1] | 1 eq. Li | 28,000 | 190 |
| (III.b)[2] | 1 eq. Li | 22,500 | 230 |
| (III.c) | 1 mol Zn | n.d. | 8 |
| (III.d) | 1 eq. Zn | n.d. | 30 | n.d. = not determined

TABLE 4

Water Vapor Transport Rates and Swelling Data for Membranes Prepared by Contacting an Already Cast Membrane of Non-neutralized Sulfonated Block Copolymer With a Solution (0.001 to 1M) of NaOH in Water

| Membrane as Identified in Sect. I and V | | WVTR (g/m$^2$/day/mil) | Swelling (% uptake) |
|---|---|---|---|
| (I) | Control | 24,000 | 140 |
| (V.a) | 1M NaOH | 25,000 | 23 |
| (V.b) | 0.1M NaOH | 22,000 | 42 |
| (V.c) | 0.01M NaOH | 27,000 | 49 |
| (V.d) | 0.001M NaOH | 30,000 | 52 |

A particularly useful property of the sulfonated block copolymers which serve as the starting material for the neutralization reaction is that they may be cast into membranes which are capable of transporting water at a high rate while rejecting the transport of other chemicals. Transport rates in excess of 20 liters of water per m$^2$ of surface area per day have been observed for membranes of about 1 mil thickness. This is one of the desirable performance characteristics for these materials.

Surprisingly, it has been found that the metal neutralized sulfonated block copolymers afforded membranes which were equally effective in transporting water (see Table 3). The high rate at which water is transported through the membranes requires that the membranes possess a continuous phase allowing for water transport. As the membranes were cast from a solution in which the ion containing phase was not continuous but was of a spherical micellar structure and therefore, if necessity dispersed, it was surprising that membranes were formed which allowed for the water to move from one surface of the membrane to the other.

Additionally and also surprisingly, the membranes cast from solutions that had been neutralized with multivalent ions were capable of transporting high amounts of water without exhibiting significant swelling of the ion containing phase (see Table 3). In the case of the control polymer (I), high water flow rates through the membrane were accompanied by substantial swelling on contact with water.

As shown by the data set forth in Table 3, the membranes cast from sulfonated block copolymers which had been neutralized by $Li^+$ ions exhibited excessive swelling. Neutralizing the already cast membrane with an aqueous solution of sodium hydroxide yielded improved dimensional stability as compared with the control membrane (I).

What is claimed is:

1. A process for neutralizing a non-neutralized sulfonated block copolymer having a general configuration A-B-D-B-A, A-D-B-D-A, $(A-D-B)_n(A)$, $(A-B-D)_n(A)$, $(A-B-D)_nX$, $(A-D-B)_nX$, or mixtures thereof, wherein n is an integer from 2 to about 30, X is coupling agent residue, each A block contains essentially no sulfonic acid or sulfonate functional groups, each B block is a polymer block containing from about 10 to about 100 mol-% sulfonic acid or sulfonate functional groups based on the number of monomer units of the B block, and each D block is an impact modifier block having a glass transition temperature less than 20° C., which process comprises providing a micellar solution comprising from about 1 to about 30%-wt, of the non-neutralized block copolymer and an organic solvent, wherein the organic solvent consists of one or more aprotic, apolar aliphatic solvents, and adding at least one metal compound to the solution, wherein the metal has an atom number of at least 11.

2. The process of claim 1 wherein from about 80% to about 100% of the sulfonic acid or sulfonate functional groups are neutralized.

3. The process of claim 1 wherein the metal compound is added in an amount of from about 0.8 to about 10 metal equivalents per 1 equivalent of sulfonic acid or sulfonate functional group of the non-neutralized block copolymer.

4. The process of claim 1 wherein the organic solvent is a non-halogenated aliphatic solvent.

5. The process of claim 1 wherein the metal compound is selected from the group of organometal compounds, metal hydrides, metal oxides, metal hydroxides, metal alkoxides, metal carbonates, metal hydrogencarbonates, and metal carboxylates.

6. The process of claim 1 wherein the metal compound comprises sodium, potassium, cesium, magnesium, calcium, strontium, barium, aluminum, tin, lead, titanium, zirconium, vanadium, chromium, molybdenum, manganese, iron, cobalt, nickel, copper, silver, zinc, cadmium, or mercury.

7. The process of claim 1 wherein the metal of the metal compound has an atom number of at least 12.

8. The process of claim 1 wherein the metal compound comprises magnesium, calcium, aluminum, copper, or zinc.

9. The process of claim 1 wherein the metal is in an oxidation state of +2, +3 or +4.

10. A means for storing a polar component comprising a non-polar, liquid phase and from about 1 to about 30%-wt, of a sulfonated block copolymer having a general configuration A-B-D-B-A, A-D-B-D-A, $(A-D-B)_n(A)$, $(A-B-D)_n(A)$, $(A-B-D)_nX$, $(A-D-B)_nX$, or mixtures thereof, wherein n is an integer from 2 to about 30, X is coupling agent residue, each A block contains essentially no sulfonic acid or sulfonate functional groups, each B block is a polymer block containing from about 10 to about 100 mol-% sulfonic acid or sulfonate functional groups based on the number of monomer units of the B block, and each D block is an impact modifier block having a glass transition temperature less than 20° C., wherein the non-polar, liquid phase consists of one or more aprotic, non-polar aliphatic solvents, and the sulfonated block copolymer is present in the non-polar, liquid phase in micellular form adapted to immure the polar component.

11. A process for stabilizing or storing a polar component in a non-polar liquid phase which comprises a. providing solution comprising a non-polar, liquid phase and from about 1 to about 30%-wt, of a sulfonated block copolymer having a general configuration A-B-D-B-A, A-D-B-D-A, $(A-D-B)_n(A)$, $(A-B-D)_n(A)$, $(A-B-D)_nX$, $(A-D-B)_nX$, or mixtures thereof, wherein n is an integer from 2 to about 30, X is coupling agent residue, each A block contains essentially no sulfonic acid or sulfonate functional groups, each B block is a polymer block containing from about 10 to about 100 mol-% sulfonic acid or sulfonate functional groups based on the number of monomer units of the B block, and each D block is an impact modifier block having a glass transition temperature less than 20° C., wherein the solution comprises the sulfonated block copolymer in micellular form, wherein the non-polar, liquid phase consists of one or more aprotic, non-polar aliphatic solvents, and b. adding at least one polar component to the solution (a) whereby the polar component is immured in the micelles.

12. The process of claim 11 wherein the polar component is a metal compound.

* * * * *